United States Patent [19]

Gagneux et al.

[11] 3,852,300

[45] Dec. 3, 1974

[54] CERTAIN 6-PHENYL-4H-S-TRIAZOLO [1,5-a][1,4-BENZODIAZEPINES]

[75] Inventors: Andre Gagneux, Basel; Roland Heckendorn, Arlesheim, Basel-Land; Rene Meier, Buus, Basel-Land, all of Switzerland

[73] Assignee: Ciba-Geigy Corporation, Ardsley, N.Y.

[22] Filed: Dec. 8, 1971

[21] Appl. No.: 206,176

[30] Foreign Application Priority Data
Dec. 11, 1970 Switzerland.................... 18385/70
Apr. 8, 1971 Switzerland.................... 5232/71

[52] U.S. Cl......... 260/308 R, 260/239.3 D, 424/269
[51] Int. Cl............................................ C07d 57/02
[58] Field of Search .............................. 260/308 R

[56] References Cited
UNITED STATES PATENTS
3,703,525  11/1972  Tawada et al................. 260/308 R OTHER PUBLICATIONS
Elderfield, Heterocyclic Compounds, Vol. 7, (New York, 1961), pages 451,454.

*Primary Examiner*—Alton D. Rollins
*Attorney, Agent, or Firm*—Joseph G. Kolodny; Ronald A. Dargnault

[57] ABSTRACT

A new process for the production of compounds of the class of 6-phenyl-4H-s-triazolo[1,5-a][1,4]benzodiazepines and 2-lower alkyl-4H-s-triazolo[1,5-a][1,4]benzodiazepines, their 5-oxides and their acid addition salts is provided. Compounds of the class of 6-phenyl-4H-s-triazolo[1,5-a][1,4]benzodiazepines, their 5-oxides and their pharmaceutically acceptable acid addition salts are also obtained by a second process and have valuable central depressant properties, in particular anticonvulsant action, and inhibit somatic reflexes. They are active ingredients for pharmaceutical compositions. Specific embodiments are 6-phenyl-8-chloro-4H-s-triazolo-[1,5-a][1,4]benzodiazepine and 6-(o-chlorophenyl)-8-chloro-4H-s-triazolo[1,5-a][1,4]benzodiazepine.

6 Claims, No Drawings

CERTAIN 6-PHENYL-4H-S-TRIAZOLO[1,5-A][1,4-BENZODIAZEPINES]

DETAILED DESCRIPTION

The present invention relates to processes for the production of diazepine derivatives, to new diazepine derivatives which can be produced by application of these processes, and to therapeutic preparations containing the new diazepine derivatives.

According to the present invention there is provided a process for the production of compounds of the general formula I:

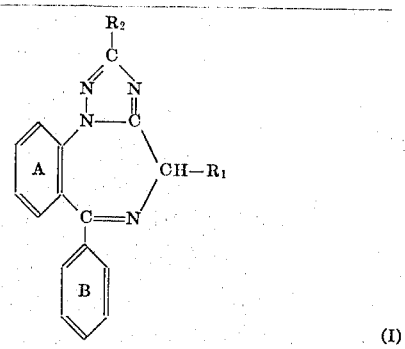

wherein
$R_1$ represents hydrogen or an alkyl group having one to three carbon atoms, and
$R_2$ represents hydrogen or an alkyl group having one to four carbon atoms,
and the rings A and B can be substituted by halogen up to atomic number 35, nitro or trifluoromethyl groups or alkyl or alkoxy groups having one to six carbon atoms, as well as their 5-oxides and their addition salts with inorganic and organic acids, by reacting a compound of the general formula II:

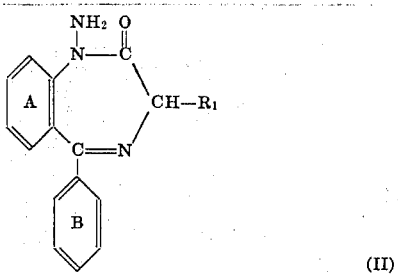

wherein $R_1$ has the meaning given under formula I, and the rings A and B can be substituted as specified under formula I, with a compound of the general formula III:

wherein
X represents oxygen, sulphur or the imino group, and simultaneously
Y represents the amino group, or X represents the imino group, and simultaneously
Y represents a lower alkoxy or alkylthio group, and
$R_2$ has the meaning given under formula I; and, optionally, oxidising the obtained product to its 5-oxide; or, optionally, converting the obtained product with an inorgainic or organic acid into an addition salt. The starting materials of the general formula III are amides, thioamides, amidines or lower imidoalkyl esters or imidothioalkyl esters of alkanoic acids having one to five carbon atoms, amides and amidines being of particular importance.

It is advantageous to perform the reaction according to the invention in a solvent. Preferably used as solvent is an excess of a compound of the general formula III. Further suitable solvents are N,N-disubstituted carboxylic acid amides such as N,N-dimethylformamide, sulphoxides such as dimethylsulphoxide, or alkanols such as methanol or ethanol. The reaction according to the invention is preferably performed in the presence of a condensation agent. Suitable condensation agents are Lewis acids such as aluminium chloride or zinc chloride, or mineral acids such as concentrated sulphuric acid and, in particular, polyphosphoric acid. Instead of adding mineral acids as condensation agents, it is possible to use lower imidoalkyl esters or imidothioalkyl esters of the general formula III, also in the form of their addition salts with mineral acids, particularly in the form of their hydrochlorides. The reaction temperature is e.g., ca. 50° to 150°C, and the reaction time amounts to e.g., ca. 24 to 48 hours.

Suitable oxidising agents for the optional subsequent conversion of compounds of the general formula I into their 5-oxides are preferably hydrogen peroxide or peroxy acids, the oxidation being effected at a temperature of e.g. ca. 0° to 70°C. Suitable peroxy acids are, e.g., peroxyacetic acid or peroxy-benzoic acids, such as peroxybenzoic acid or, in particular, m-chloroperoxybenzoic acid. The oxidising agents are preferably used in a solvent, e.g., peroxyacetic acid in acetic acid, and peroxybenzoic acid in halogenated hydrocarbons such as methylene chloride or chloroform.

The formation of acid addition salts is further discussed later on in the text.

The starting materials of the general formula II can be produced, for example, by starting with known compounds of the general formula IIa:

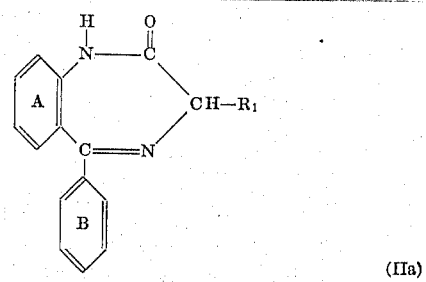

wherein $R_1$ has the meaning given under formula I, and the rings A and B can be substituted as specified under formula I. These compounds are converted, e.g., with sodium hydride, into their sodium derivatives, and these are then reacted, e.g., with chloroamine or with 0-(2,4-dinitrophenyl)-hydroxylamine. The solvent used is, e.g., tetrahydrofuran/diethyl ether or N,N,N',N',N'',N''-hexamethyl/phosphoric acid triamide.

According to a further aspect of the invention, there is also provided a process for the production of novel compounds of the general formula Ia, which is embraced by the general formula I,

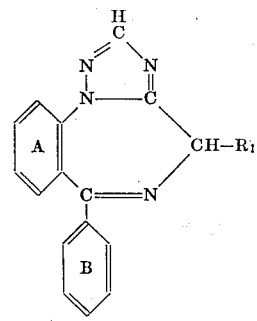

(Ia)

wherein $R_1$ has the meaning given under formula I, and the rings A and B can be substituted as specified under formula I, as well as their 5-oxides, and the their 5-oxides and their acid addition salts, which consists in decarboxylating a compound of the general formula IV:

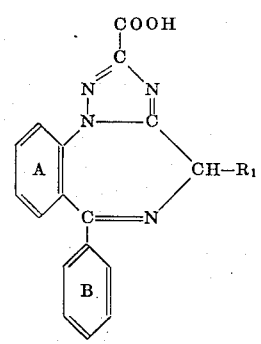

(IV)

wherein $R_1$ has the meaning given under their formula I, and the rings A and B can be substituted as specified under formula I; and, optionally, oxidising the obtained product to a 5-oxide, or, optionally converting the obtained product with an inorganic or organic acid into an addition salt.

Decarboxylation is preferably carried out in a solvent, and in the presence of a catalyst. Suitable solvents are, e.g., solvents containing hydroxyl groups, e.g., higher alkanols such as butanol or pentanol, cycloalkanols such as hexanol, phenols such as phenol or cresols, glycols such as glycol, triethylene glycol and, in particular, diethylene glycol or glycol monoalkyl ethers such as methylene glycol monomethyl ether. Catalysts which can be used in the process according to the invention are, e.g., metal salts or metal oxides, especially copper(I)-oxide. The decarboxylation is preferably performed at a reaction temperature of ca. 100° to 200°C. The obtained compounds can be converted either into their 5-oxides as described in connection with the first process, or into their acid addition salts as described below.

Starting compounds of the general formula IV are obtained, e.g., starting from compounds having the general formula IVa:

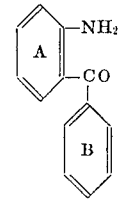

(IVa)

wherein the rings A and B can be substituted as specified under formula I. Such compounds are described in the literature, e.g., 2-amino-5-chlorobenzophenone [cp. F. D. Chattaway, J.Chem.Soc. 85, 344 (1904)], 2-amino-2',5-dichloroacetophenone [cp. L. H. Sternbach et al., J. Org. Chem. 26, 4488 (1961)] as well as 2-amino-5-chloro-2'-fluorobenzophenone and others [cp. L. H. Sternbach al., J.Org.Chem. 27, 3781-3788 (1962)]. The compounds of the general formula IVa are diazotised, and the obtained diazonium salts subsequently coupled with (2-chloroalkanamido)-malonic acid diethyl esters, such as, e.g., (2-chloroacetamido-malonic acid diethyl ester [cp. Ajay Kumar Bose, J.Indian Chem.Soc. 31, 108-110 (1954)], to the corresponding (2-chloroalkaneamido)-(2-benzoyl-phenylazo)-malonic acid diethyl esters. The coupling products are then converted with sodium hydroxide, and afterwards with hydrochloric acid, into the compounds of the general formula IVb:

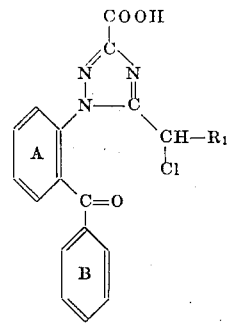

(IVb)

wherein $R_1$ has the meaning given under formula I, and the rings A and B can be substituted as specified under formula I. These compounds are reacted, preferably after a pretreatment with potassium iodide, with aqueous ammonia, or with hexamethylene tetramine, whereby the chlorine or iodine atom is replaced by the amino group, and there simultaneously occurs, by the elimination of water, ring closure to give carboxylic acids of the general formula IV. It is also possible to react the compounds of the general formula IVb firstly with sodium azide in the presence of potassium iodide to give compounds of the general formula IVc:

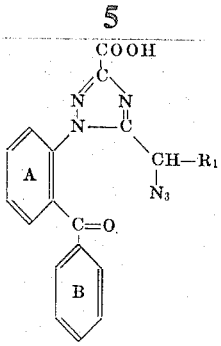

(IVc)

wherein $R_1$ has the meaning given under formula I, and the rings A and B can be substituted as specified under formula I. The compounds of the general formula IVc are thereupon cyclised with triphenylphosphine, with the evolution of nitrogen, to obtain carboxylic acids of the general formula IV.

The compounds of the general formula I or Ia obtained by application of the processes according to the invention are, optionally, subsequently converted in the usual manner into their addition salts with inorganic and organic acids. For example, to a solution of a compound of the general formula I or Ia in an organic solvent is added the acid desired as salt component. Solvents preferably chosen for the reaction are ones in which the formed salt is difficulty soluble, so that it can be separated by filtration. Such solvents are, e.g., methanol, ether, acetone, methyl ethyl ketone, acetone/ether, acetone/ethanol, methanol/ether or ethanol/ether.

For use as pharmaceutical substances it is possible to use, instead of free bases, pharmaceutically acceptable acid addition salts, i.e., salts of such acids of which the anions are not toxic in the dosage amounts in question. It is moreover of advantage if the salts to be used as pharmaceutical substances crystallise well, and are not, or only slightly, hygroscopic. For salt formation with compounds of the general formula I or Ia it is possible to use, e.g., hydrochloric acid, hydrobromic acid, sulphuric acid, phosphoric acid, methanesulphonic acid, ethane-sulphonic acid, 2-hydroxyethanesulphonic acid or citric acid.

As an alkyl group having one to three carbon atoms in the compounds of the general formulae I or Ia, as well as in the appertaining starting materials, $R_1$ is, e.g., the methyl, ethyl or propyl group. As an alkyl group having one to four carbon atoms, $R_2$ is, e.g., the ethyl, propyl, isopropyl, isobutyl or sec.butyl group and, in particular, the methyl group. Halogen atoms as substituents of the rings A and B are fluorine, chlorine or bromine atoms, whilst suitable alkyl groups and alkoxy groups having one to six carbon atoms are, e.g., methyl, ethyl, propyl, isopropyl, butyl, isobutyl, tert.butyl, pentyl, isopentyl, 2,2-dimethylpropyl, hexyl or isohexyl groups and methoxy, ethoxy, propoxy, isopropoxy, butoxy, isobutoxy, pentyloxy, isopentyloxy, 2,2-dimethylpropoxy, hexyloxy or isohexyloxy groups, respectively. A substituent of the ring A is, in particular, in the 8-position, and is preferably fluorine, bromine, the nitro group, the trifluoromethyl group, and particularly chlorine. The ring B is preferably unsubstituted, or substituted by fluorine, chlorine or bromine in any desired position; especially, however, by fluorine or chlorine in the o-position.

The compounds of the general formula I, their 5-oxides and the corresponding addition salts with inorganic and organic acids possess valuable pharmacological properties. They have a central depressant action, especially an anticonvulsive action, and inhibit somatic reflexes. Particularly effective are compounds of the general formula I containing hydrogen as the radical $R_2$, and hence corresponding to the more limited general formula Ia. Accordingly, the present invention also concerns, as new substances, the compounds of the general formula I9, their 5-oxides, and the corresponding addition salts with inorganic and organic acids, as well as therapeutic preparations containing the said new substances, and the use thereof. The already mentioned central-depressant properties, especially anticonvulsive properties, and the inhibition of somatic reflexes, and also further properties, which can be determined by selected standard tests [cp. W. Theobald and H. A. Kunz, Arzneimittelforsch. 13, 122 (1963) and also W. Theobald et al., Arzneimittelforsch. 17, 561 (1967)], characterise the compounds of the general formula Ia and their 5-oxides, as well as the corresponding pharmaceutically acceptable addition salts with inorganic and organic acids, as active substances for tranquillisers and for anticonvulsants which can be used, e.g., for the treatment of states of tension and agitation, as well as for the treatment of epilepsy.

Of particular importance are compounds of the general formula Ia wherein $R_1$ is hydrogen, the ring A is unsubstituted, or preferably substituted by a halogen atom up to atomic number 35, the nitro or trifluoromethyl group, and the ring B is either unsubstituted or substituted by one of the substituents stated for the ring A. Especially valuable within this group of compounds are, on the one hand, compounds having a chlorine atom in the ring A in the 8-position and, on the other hand, compounds with ring B unsubstituted or substituted in ortho-position by fluorine or chlorine, and, in particular, those compounds which combine both substitution characteristics, such has 6-phenyl-8-chloro-4H-s-triazolo[1,5-a][1,4]benzodiazepine.

The new active substances are administered orally, rectally and, particularly in the form of pharmaceutically acceptable acid addition salts, also parenterally. The dosage amount depends on the mode of administration, on the species, on the age and on the individual condition. The daily dosages of the free bases, of their 5-oxides, or of pharmaceutically acceptable acid addition salts of the free bases, vary between 0.15 mg/kg and 15 mg/kg for warm-blooded animals. Suitable dosage units such as dragees, tablets, suppositories or ampoules preferably contain 2.5 – 100 mg. of an active substance according to the invention.

Dosage units for oral administration preferably contain as active substance between 5 percent and 80 percent of a compound of the general formula I, of its 5-oxide, or of a corresponding, pharmaceutically acceptable acid addition salt. Such dosage units are prepared by the combination of the active substance, e.g., with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragee cores. The dragee cores are coated, e.g., with concentrated sugar solutions which can also contain, e.g., gum arabic, talcum and/or titanium dioxide; or with a lacquer dissolved in readily volatile organic solvents or solvent mixtures. Dyestuffs can be added to these coatings, e.g., for identification of the various dosages of active substance.

Further suitable oral dosage units are hard gelatine capsules, as well as soft closed capsules made from gelatine and a softener such as glycerin. The hard capsules contain the active substance preferably as a granulate, e.g., in admixture with fillers such as maize starch, and/or with lubricants such as talcum or magnesium stearate, and optionally stabilisers such as sodium metabisulphite ($Na_2S_2O_5$), or ascorbic acid. In soft capsules, the active substance is preferably dissolved or suspended in suitable liquids, such as liquid polyethylene glycols, whereby likewise stabilisers may be added.

Suitable dosage units for rectal administration are, e.g., suppositories consisting of a combination of an active substance and a suppository base substance. Suitable suppository base substances are, e.g., natural or synthetic triglycerides, paraffin hydrocarbons, polyethylene glycols or higher alkanols. Also suitable are gelatine rectal capsules consisting of a combination of the active substance with a base substance. Suitable base substances are, e.g., liquid triglycerides, polyethylene glycols or paraffin hydrocarbons.

Ampoules for parenteral administration, especially intramuscular administration, preferably contain a water-soluble salt of an active substance in a concentration preferably of 0.5 – 5 percent, optionally together with suitable stabilising agents and buffer substances, in aqueous solution.

The following directions further illustrate the preparation of tablets, dragees, capsules, suppositories and ampoules:

a. An amount of 250 g of 6-phenyl-8-chloro-4H-s-triazolo[1,5-a][1,4]benzodiazepine is mixed with 175.80 g of lactose and 169.70 g of potato starch; the mixture is moistened with an alcoholic solution of 10 g of stearic acid, and then granulated through a sieve. After drying of the granulate, 160 g of potato starch, 200 g of talcum, 2.50 g of magnesium stearate and 32 g of colloidal silicon dioxide are mixed in, the mixture being then pressed out to obtain 10,000 tablets each weighing 100 mg and each containing 25 mg of active substance. Optionally, the tablets can be provided with grooves to ensure a more precise adjustment of the dosage amount.

b. A granulate is produced from 100 g of 6-phenyl-8-chloro-4H-s-triazolo[1,5-a][1,4]benzodiazepine, 175.90 g of lactose and the alcoholic solution of 10 g of stearic acid; the obtained granulate is dried and then mixed with 56.60 g of colloidal silicon dioxide, 165 g of talcum, 20 g of potato starch and 2.50 g of magnesium stearate; the mixture is finally pressed out to obtain 10,000 dragee cores. These are subsequently coated with a concentrated syrup made from 502.28 g of crystallised saccharose, 6 g of shellac, 10 g of gum arabic, 0.22 g of dyestuff and 1.5 g of titanium dioxide; the coated dragee cores are afterwards dried. The obtained dragees each weight 105 mg and each contain 10 mg. of active substance.

c. To produce 1000 capsules each containing 25 mg of active substance, 25 g of 6-chloro-8-phenyl-4H-s-triazolo[1,5-a][1,4]benzodiazepine are mixed with 248 g of lactose; the mixture is evenly moistened with an aqueous solution of 2 g of gelatine, and then granulated through a suitable sieve (e.g., sieve III according to Ph.Helv. V). The granulate is mixed with 10.0 g of dried maize starch and 15.0 g of talcum, and the mixture evenly filled into 1000 hard gelatine capsules, size 1.

d. A suppository base substance is prepared from 2.5 g of 6-chloro-8-phenyl-4H-s-triazolo[1,5-a][1,4]benzodiazepine and 167.5 g of Adeps solidus, and from this are then poured 100 suppositories each containing 25 mg of active substance.

e. A solution of 10 g of 6-chloro18-phenyl-4H-s-triazolo[1,5-a][1,4]benzodiazepine-hydrochloride in one litre of water is filled into 1,000 ampoules and sterilised. An ampoule contains a 1.0 percent solution of 10 mg of active substance.

The following examples further illustrate the preparation of the new compounds of the general formula I and of intermediates not hitherto described; these examples do not, however, in any way limit the scope of the invention. The temperatures are given in degrees Centigrade; and silica gel, Merck, particle size 0.05–0.2 mm, is used for the elution chromatography.

EXAMPLE 1 a. An amount of 40 mg of polyphosphoric acid is added to 5.9 g (0.02 moles) of crude 1-amino-1,3-dihydro-5-phenyl-7-chloro-2H-1,4-benzodiazepin-2-one dissolved in in 180 ml of formamide. The reaction mixture is heated for 50 hours at 105°, subsequently poured on to ice water, and extracted with ether. The ether extract is washed with water and with saturated sodium chloride solution; it is then dried over sodium sulphate and concentrated in vacuo. The residue is dissolved in methylene chloride/methanol (96:4), and the solution chromatographed on a column of 1,000 g of silica gel. Methylene chloride/methanol (96:4) is used as the eluant. The fractions containing, according to the thin-layer chromatogram (silica gel), the desired product ($R_f$ 0.55) together with a little 1,3-dehydro-5-phenyl-7-chloro-2H-1,4-benzodiazepine ($R_f$ 0.37) are combined, concentrated by evaporation, and taken up in a little ether. The crystalline by-product is filtered off, the ether solution concentrated by evaporation, and the residue dissolved in benzene/ethyl acetate (3:2). The solution is chromatographed on a column of 500 g of silica gel, benzene/ethyl acetate (3:2) being used as the eluant. The fractions containing the desired product ($R_f$ 0.37) are combined and concentrated by evaporation. The residue is dissolved in methylene chloride, and the solution filtered through 100 g of aluminium oxide (activation I, neutral). The filtrate is concentrated in vacuo to obtain amorphous 6-phenyl-8-chloro-4H-s-triazolo[1,5-a][1,4]benzodiazepine, which liquifies at 60°–70°. It crystallises on standing and can be recrystallised from isopropanol, M.P. 126–128°.

In an analogous manner are obtained from the stated amounts (in each case 0.02 moles) of the below listed starting materials the corresponding final products:

from 6.45 g of 1-amino-1,3-dihydro-5-(o-chlorophenyl)-7-chloro-2H-1,4-benzodiazepin-2-one:- 6-(o-chlorophenyl)-8-chloro-4H-s-triazolo[1,5-a][1,4]benzodiazepine; M.P. 175–177° from 6.12 g of 1-amino-1,3-dihydro-5-(o-fluorophenyl)-7-chloro-2H-1,4-benzodiazepin-2-one;- 6-(o-fluorophenyl)-8-chloro-4H-s-triazolo[1,5-a][1,4]benzodiazepine;

from 5.42 g of 1-amino-1,3-dihydro-5-phenyl-7-fluoro-2H-1,4-benzodiazepin-2-one:- 6-phenyl-8-fluoro-4H-s-triazolo[1,5-a][1,4]benzodiazepine;

from 6.65 g of 1-amino-1,3-dihydro-5-phenyl-7-bromo-2H-1,4-benzodiazepin-2-one:- 6-phenyl-8-bromo-4H-s-triazolo [1,5-a][1,4]benzodiazepine;

from 6.42 g of 1-amino-1,3-dihydro-5-phenyl-7-(trifluoromethyl)-2H-1,4-benzodiazepin-2-one:- 6-phenyl-8-(trifluoromethyl)-4H-s-triazolo[1,5-a][1,4]benzodiazepine;

from 6.0 g of 1-amino-1,3-dihydro-5-phenyl-7-nitro-2H-1,4-benzodiazepin-2-one:- 6-phenyl-8-nitro-4H-s-triazolo [1,5-a][1,4]benzodiazepine;

from 5.35 g of 1-amino-1,3-dihydro-5-phenyl-7-methyl-2H-1,4-benzodiazepin-2-one:- 6-phenyl-8-methyl-4H-s-triazolo [1,5-a][1,4]benzodiazepine;

from 5.66 g of 1-amino-1,3-dihydro-5-phenyl-7-methoxy-2H-1,4-benzodiazepin-2-one:- 6-phenyl-8-methoxy-4H-s-triazolo [1,5-a][1,4]benzodiazepine;

from 5.06 g of 1-amino-1,3-dihydro-5-phenyl-2H-1,4-benzodiazepin-2-one:- 6-phenyl-4H-s-triazolo[1,5-a][1,4]benzodiazepine;

from 6.0 g of 1-amino-1,3-dihydro-5-(o-nitrophenyl)-2H-1,4-benzodiazepin-2-one:- 6-(o-nitrophenyl)-4H-s-triazolo[1,5-a][1,4]benzodiazepine;

from 6.68 g of 1-amino-1,3-dihydro-5-(o-chlorophenyl)-7-nitro-2H-1,4-benzodiazepin-2-one:- 6-(o-chlorophenyl)-8-nitro-4H-s-triazolo[1,5-a][1,4]benzodiazepine;

from 5.9 g of 1-amino-1,3-dihydro-5-(o-chlorophenyl)-2H-1,4-benzodiazepin-2-one:- 6-(o-chlorophenyl)-4H-s-triazolo [1,5-a][1,4]benzodiazepine;

from 6.05 g of 1-amino-1,3-dihydro-5-(o-chlorophenyl)-7-methyl-2H-1,4-benzodiazepin-2-one:- 6-(o-chlorophenyl)-8-methyl-4H-s-triazolo[1,5-a][1,4]benzodiazepine;

from 6.05 g of 1-amino-1,3-dihydro-5-(o-tolyl)-7-chloro-2H-1,4-benzodiazepin-2-one:- 6-(o-tolyl)-8-chloro-4H-s-triazolo[1,5-a][1,4]benzodiazepine;

from 6.36 g of 1-amino-1,3-dihydro-5-(o-methoxyphenyl)-7-chloro-2H-1,4-benzodiazepin-2-one:- 6-(o-methoxyphenyl)-8-chloro-4H-s-triazolo[1,5-a][1,4]benzodiazepine;

from 6.36 g of 1-amino-1,3-dihydro-5-(p-methoxyphenyl)-7-chloro-2H-1,4-benzodiazepin-2-one:- 6-(p-methoxyphenyl)-8-chloro-4H-s-triazolo[1,5-a][1,4]benzodiazepine;

from 7.12 g of 1-amino-1,3-dihydro-5-($\alpha,\alpha,\alpha$-trifluoro-o-tolyl)-7-chloro-2H-1,4-benzodiazepin-2-one:- 6-($\alpha,\alpha,\alpha$-trifluoro-o-tolyl)-8-chloro-4H-s-triazolo[1,5-a][1,4]benzodiazepine.

The 1-amino-1,3-dihydro-5-phenyl-7-chloro-2H-1,4-benzodiazepin-2-one used as starting material is prepared as follows:

b. An amount of 2.9 g (0.06 moles) of sodium hydride (50 percent dispersion in mineral oil) is suspended in 50 ml of hexamethylphosphoric acid triamide. To this suspension is added dropwise within 15 minutes, at room temperature, a solution of 13.6 g (0.05 moles) of 1,3-dihydro-5-phenyl-7-chloro-2H-1,4-benzodiazepin-2-one in 80 ml of hexamethylphosphoric acid triamide. The mixture is heated for 30 minutes at 50°, subsequently cooled to 10°, and a solution of 12 g (0.06 moles) of O-(2,4-dinitrophenyl)-hydroxylamine in 100 ml of hexamethyl-phosphoric acid triamide is added. Stirring is then carried out for 2 hours at room temperature; to the suspension is added one litre of ice-water, and the whole extracted three times with 500 ml of ether each time. The ether extract is washed five times with 200 ml of water each time, and once with 100 ml of concentrated aqueous sodium chloride solution; it is then dried over sodium sulphate and concentrated by evaporation. In this manner is obtained crude amorphous 1-amino-1,3-dihydro-5-phenyl-7-chloro-2H-1,4-benzodiazepin-2-one, which liquifies at 70°–75°.

The corresponding 1-amino derivatives are obtained in an analogous manner from the stated amounts, representing in each case 0.05 moles, of the below given starting materials:

from 15.3 g of 1,3-dihydro-5-(o-chlorophenyl)-7-chloro-2H-1,4-benzodiazepin-2-one:- 1-amino-1,3-dihydro-5-(o-chlorophenyl)-7-chloro-2H-1,4-benzodiazepin-2-one, M.P. 202°–204°(from methanol);

from 14.5 g of 1,3-dihydro-5-(o-fluorophenyl)-7-chloro-2H-1,4-benzodiazepin-2-one:- 1-amino-1,3-dihydro-5-(o-fluorophenyl)-7-chloro-2H-1,4-benzodiazepin-2-one;

from 12.7 g of 1,3-dihydro-5-phenyl-7-fluoro-2H-1,4-benzodiazepin-2-one:- 1-amino-1,3-dihydro-5-phenyl-7-fluoro-2H-1,4-benzodiazepin-2-one;

from 15.8 g of 1,3-dihydro-5-phenyl-7-bromo-2H-1,4-benzodiazepin-2-one:- 1-amino-1,3-dihydro-5-phenyl-7-bromo-2H-1,4-benzodiazepin-2-one;

from 15.2 g of 1,3-dihydro-5-phenyl-7-(trifluoromethyl)-2H-1,4-benzodiazepin-2-one:- 1-amino-1,3-dihydro-5-phenyl-7-(trifluoromethyl)-2H-1,4-benzodiazepin-2-one;

from 14.1 g of 1,3-dihydro5-phenyl-7-nitro-2H-1,4-benzodiazepin-2-one:- 1-amino-1,3-dihydro-5-phenyl-7-nitro-2H-1,4-benzodiazepin-2-one;

from 12.5 g of 1,3-dihydro-5-phenyl-7-methyl-2H-1,4-benzodiazepin-2-one:- 1-amino-1,3-dihydro-5-phenyl-7-methyl-2H-1,4-benzodiazepin-2-one;

from 13.3 g of 1,3-dihydro-5-phenyl-7-methoxy-2H-1,4-benzodiazepin-2-one:- 1-amino-1,3-dihydro-5-phenyl-7-methoxy-2H-1,4-benzodiazepin-2-one;

from 11.8 g of 1,3-dihydro-5-phenyl-2H-1,4-benzodiazepin-2-one:- 1-amino-1,3-dihydro-5-phenyl-2H-1,4-benzodiazepin-2-one;

from 14.1 g of 1,3-dihydro-5-(o-nitrophenyl)-2H-1,4-benzodiazepin-2-one:- 1-amino-1,3-dihydro-5-(o-nitrophenyl)-2H-1,4-benzodiazepin-2-one;

from 15.9 g of 1,3-dihydro-5-(o-chlorophenyl)-7-nitro2H-1,4-benzodiazepin-2-one:- 1-amino-1,3-dihydro-5-(o-chlorophenyl)-7-nitro-2H-1,4-benzodiazepin-2-one;

from 13.6 g of 1,3-dihydro-5-(o-chlorophenyl)-2H-1,4-benzodiazepin-2-one:- 1-amino-1,3-dihydro-5-(o-chlorophenyl)-2H-1,4-benzodiazepin-2-one;

from 14.3 g of 1,3-dihydro-5-(o-chlorophenyl)-7-methyl-2H-1,4-benzodiazepin-2-one:- 1-amino-1,3-dihydro-5-(o-chlorophenyl)-7-methyl-2H-1,4-benzodiazepin-2-one;

from 14.3 g of 1,3-dihydro-5-(o-tolyl)-7-chloro-2H-1,4-benzodiazepin-2-one;- 1-amino-1,3-dihydro-5-(o-tolyl)-7-chloro-2H-1,4-benzodiazepin-2-one;

from 15.1 g of 1,3-dihydro-5-(o-methoxyphenyl)-7-chloro-2H-1,4-benzodiazepin12-one:- 1-amino- 1,3-dihydro-5-(o-methoxyphenyl)-7-chloro-2H-1,4-benzodiazepin-2-one;

from 15.1 g of 1,3-dihydro-5-(p-methoxyphenyl)-7-chloro-2H-1,4-benzodiazepin-2-one:- 1-amino-1,3-dihydro-5-(p-methoxyphenyl)-7-chloro-2H-1,4-benzodiazepin-2-one;

from 17.0 g of 1,3-dihydro-5-(α,α,α-trifluoro-o-tolyl)-7-chloro-2H-1,4-benzodiazepin-2-one:- 1-amino-1,3-dihydro-5-(α,α,α-trifluoro-o-tolyl)-7-chloro-2H-benzodiazepin-2-one.

The required starting materials can be prepared also by the following process:

c. An amount of 2.3 g (0.05 moles) of sodium hydride (50 percent dispersion in mineral oil) is suspended in 30 ml of absolute tetrahydrofuran. To this suspension is added dropwise at 5°, in the course of 15 minutes, a solution of 10.0 g (0.037 moles) of 1,3-dihydro-5-phenyl-7-chloro-2H-1,4-benzodiazepin-2-one in 70 ml of absolute tetrahydrofuran. The mixture is refluxed for 15 minutes and subsequently cooled to 25°; a solution of 2.6 g (0.052 moles) of chloroamine in 500 ml of ether is added, and the whole then stirred for 15 hours at room temperature. Ice water is afterwards added to the suspension, and the organic phase separated. The organic solution is washed with water, dried over sodium sulphate, and concentrated in vacuo. The residue is dissolved in methylene chloride/methanol (98:2), and the solution chromatographed on a column of 700 g of silica gel with the eluant methylene chloride/methanol (98:2). The fractions are concentrated by evaporation, and the residues consisting, according to the thin-layer chromatograph on silica gel [in the system ethyl acetate/benzene (3:2): $R_f$ 0.47], of the desired product are combined. In this manner is obtained crude amorphous 1-amino-1,3-dihydro-5-phenyl-7-chloro-2H-1,4-benzodiazepin-2-one.

The further 1-amino compounds already mentioned under (b) can be produced in an analogous manner.

EXAMPLE 2

A mixture of 1.0 g (0.0035 moles) of crude 1-amino-1,3-dihydro-5-phenyl-7-chloro-2H-1,4-benzodiazepin-2-one and 2.5 g (0.042 moles) of acetamide is heated to 90°. An amount of 50 mg of polyphosphoric acid is added to the melt and the whole heated, with occasional stirring, for 3 hours at 115°. The reaction mixture is afterwards poured on to ice water and extracted with ether. The ether extract is washed with water and with saturated aqueous sodium chloride solution, dried over sodium sulphate and concentrated by evaporation. The residue is dissolved in ethyl acetate/benzene (3:2), and the solution chromatographed on a column of 150 g of silica gel. Ethyl acetate/benzene (3:2) and ethyl acetate/benzene (3:1) are used as the eluant. The fractions containing, according to the thin-layer chromatogram, the desired product [$R_f$ 0.26 in the system ethyl acetate/benzene (3:2)] and a by-product ($R_f$ 0.22 in the same system) are combined and concentrated by evaporation. The residue is dissolved in methylene chloride/methanol (95:5), and the solution chromatographed on a column of 50 g of silica gel. Methylene chloride/methanol (95:5) is used as the eluant. The fractions which contain, according to the thin-layer chromatogram in the same system ($R_f$ 0.47), the desired crude product are combined, concentrated by evaporation, and the residue recrystallised from isopropanol to obtain pure 8-chloro-2-methyl-6-phenyl-4H-s-triazolo[1,5-a][1,4]benzodiazepine, M.P. 164°–166°.

EXAMPLE 3 a. A solution of 16.0 g (0.047 moles) of 6-phenyl-8-chloro-4H-s-triazolo[1,5-a][1,4]benzodiazepine-2-carboxylic acid in 320 ml of diethylene glycol is heated under nitrogen to 120°, and 200 mg of copper(I)-oxide are added, whereupon the starting product decomposes with the evolution of carbon dioxide. The reaction mixture is heated for 14 hours at 120°–125°; it is subsequently cooled, diluted with 3 litres of ice water, and extracted three times with one litre of ether each time. The ether extract is washed with water, dried over sodium sulphate, and concentrated in vacuo. The residue (12.0 g) is dissolved in benzene/ethyl acetate, and the solution chromatographed on a column of 1,000 g of silica gel. Benzene/ethyl acetate (3:2) is used as the eluant. The fractions in which the desired product ($R_f$ 0.37) is dissolved are concentrated by evaporation, and the residue recrystallised from isopropanol, whereupon pure 6-phenyl-8-chloro-4H-s-triazolo[1,5-a][1,4]benzodiazepine, M.P. 126°–128°, is obtained.

The following are obtained in an analogous manner:

from 18.6 g (0.05 moles) of 6-(o-chlorophenyl)-8-chloro-4H-s-triazolo[1,5-a][1,4]benzodiazepine-2-carboxylic acid: 6-(o-chlorophenyl)-8-chloro-4H-s-triazolo[1,5-a][1,4]benzodiazepine, M.P. 175°–177° (from isopropanol);

from 17.8 g (0.05 moles of 6-(o-fluorophenyl)-8-chloro-4H-s-triazolo[1,5-a][1,4]benzodiazepine-2-carboxylic acid:-6-(o-fluorophenyl)-8-chloro-4H-s-triazolo[1,5-a][1,4]benzodiazepine;

from 20.4 g (0.05 moles) of 6-(α,α,α-trifluoro-o-tolyl)-8-chloro-4H-s-triazolo[1,5-a][(1,4]benzodiazepine-2-carboxylic acid:- 6-(α,α,α-trifluoro-o-tolyl)-8-chloro-4H-s-triazolo[1,5-a][1,4]benzodiazepine;

from 16.1 g (0.05 moles) of 6-phenyl-8-fluoro-4H-s-triazolo[1,5-a][1,4]benzodiazepine-2-carboxylic acid:- 6-phenyl-8-fluoro-4H-s-triazolo[1,5-a][1,4]benzodiazepine;

from 19.2 g (0.05 moles) of 6-phenyl-8-bromo-4H-s-triazolo[1,5-a][1,4]benzodiazepine-2-carboxylic acid:- 6-phenyl-8-bromo-4H-s-triazolo[1,5-a][1,4]benzodiazepine;

from 18.6 g (0.05 moles) of 6-phenyl-8-(trifluoromethyl)-4H-s-triazolo[1,5-a][1,4]benzodiazepine-2-carboxylic acid: 6-phenyl-8-trifluoromethyl-4H-s-triazolo[1,5-a][1,4]benzodiazepine;

from 17.5 g (0.05 moles) of 6-phenyl-8-nitro-4H-s-triazolo[1,5-a](1,4]benzodiazepine-2-carboxylic acid:- 6-phenyl-8-nitro-4H-s-triazolo[1.5-a][1,4]benzodiazepine.

The 6-phenyl-8-chloro-4H-s-triazolo[1,5-a][1,4]benzodiazepine-2-carboxylic acid is produced as follows:

b. A solution of 58.0 g (0.25 moles) of 2-amino-5-chlorobenzophenone [cp. F.D. Chattaway, J.Chem.-Soc. 85, 344 (1904)] in 310 ml of glacial acetic acid/concentrated hydrochloric acid (4:1) is diazotised at room temperature, whilst the solution is stirred, with 50 ml (0.25 moles) of aqueous sodium nitrite solution. An addition is made to the obtained diazonium salt solution of 150 g of ice followed by the rapid addition dropwise of a solution of 52.4 g (0.208 moles) of (2- chloroacetamido)-malonic acid diethyl ester [cp. Ajay Kumar Bose, J. Indian Chem.Soc. 31, 108–110 (1954)] in 600 ml of acetone. A solution of 276.0 g (2 moles) of potassium carbonate in 500 ml of water is subsequently added dropwise at 5°–10° in the course of 20 minutes; stirring is continued for a further hour, and benzene and saturated sodium chloride solution are then added. The benzene solution is separated, washed with saturated sodium chloride solution, dried over sodium sulphate, and concentrated by evaporation. In this way are obtained 121 g of crude 2'-chloroacetamido-(2-benzoyl-4-chlorophenylazo)-malonic acid diethyl ester, which is dissolved in 1.5 litres of dioxane. To the obtained dioxane solution are added 36 g (0.9 moles) of sodium hydroxide dissolved in 2 litres of water; the mixture is stirred for 30 minutes and the dioxane then evaporated off in vacuo. The residue is diluted with 500 ml of water, and 20 g of active charcoal are added; the mixture is then well stirred and filtered through purified diatomaceous earth. To the filtrate is added, with thorough stirring, 2-n hydrochloric acid until an acid reaction to a congo-red indicator is obtained; the precipitated carboxylic acid is filtered off under suction, washed with water, and recrystallised from hot methanol. The obtained 1-(2-benzoyl-4-chlorophenyl)-5-(chloromethyl)-1H-1,2,4-triazole-3-carboxylic acid sinters at 137°–138°, and melts with decomposition at 169°–171°. The crystals contain an equimolar amount of methanol.

The following are obtained in an analogous manner: with the use of 66.5 g (0.25 moles) of 2-amino-2',5-dichlorobenzophenone:- 1-[2-(o-chlorobenzoyl)-4-chlorophenyl]-5-(chloromethyl)-1H-1,2,4-triazole-3-carboxylic acid, M.P. 170°–175° (decomposition; substance precipitated with 2-n hydrochloric acid from solution in aqueous ammonia);

with the use of 62.5 g (0.25 moles) of 2-amino-5-chloro-2'-fluorobenzophenone:- 1-[2-(o-fluorobenzoyl)-4-chlorophenyl]-5-(chloromethyl)-1H-1,2,4-triazole-3-carboxylic acid;

with the use of 75.0 g (0.25 moles) of 2-amino-5-chloro-2'-(trifluoromethyl)-benzophenone:- 1-[2-(α,α,α-trifluoro-o-tolyl)-4-chlorophenyl]-5-(chloromethyl)-1H-1,2,4-triazole-3-carboxylic acid;

with the use of 53.8 g (0.25 moles) of 2-amino-5-fluoro-benzophenone:- 1-(2-benzoyl-4-fluorophenyl)-5-(chloromethyl)-1H-1,2,4-triazole-3-carboxylic acid;

with the use of 69.0 g (0.25 moles) of 2-amino-5-bromobenzo-phenone:- 1-(2-benzoyl-4-bromophenyl)-5-(chloromethyl)-1H-1,2,4-triazole-3-carboxylic acid;

with the use of 66.2 g (0.25 moles) of 2-amino-5-(trifluoro-methyl)-benzophenone:- 1-(2-benzoyl-α,α,α-trifluoro-p-tolyl)-5-(chloromethyl)-1H-1,2,4-triazole-3-carboxylic acid;

with the use of 60.8 g (0.25 moles) of 2-amino-5-nitrobenzophenone:- 1-(2-benzoyl-4-nitrophenyl)-5-(chloromethyl)-1H-1,2,4-triazole-3-carboxylic acid.

c. An amount of 33.2 g (0.20 moles) of potassium iodide is dissolved in 85 ml of water. The obtained solution is diluted with 850 ml of dioxane, and an addition then made at 25°, with stirring, of 71.5 g (0.175 moles) of the 1-(2-benzoyl-4-chlorophenyl)-5-(chloromethyl)-1H-1,2,4-triazole-3-carboxylic acid produced according to b) containing an equimolar amount of methanol. The reaction solution is heated for one hour at 45°–50° and 0.5 litres of aqueous ammonia are then added; the mixture is heated for 2 hours at 45°–50° and afterwards concentrated in vacuo. The residue is dissolved in 2 litres of water, and 2-n hydrochloric acid added until an acid reaction to a congo-red indicator is shown. The free carboxylic acid precipitates; it is then filtered off under suction, washed until neutral with water, subsequently washed with methanol, and dried at 120°–130° in vacuo. The obtained 6-phenyl-8-chloro- 4H-s-triazolo[1,5-a][1,4]benzodiazepine-2-carboxylic acid decomposes at 170°.

The following are obtained in an analogous manner:
from 72.0 g (0.175 moles) of 1-[2-(o-chlorobenzoyl)-4-chlorophenyl]-5-(chloromethyl)-1H-1,2,4-triazole-3-carboxylic acid:- 6-(o-chlorophenyl)-8-chloro-4H-s-triazolo[1,5-a][1,4]benzodiazepine-2-carboxylic acid, M.P. 190°–195° (decomposition from methanol);

from 69.0 g (0.175 moles) of 1-[2-(o-fluorobenzoyl)-4-chlorophenyl]-5-(chloromethyl)-1H-1,2,4-triazole-3-carboxylic acid:- 6-(o-fluorophenyl)-8-chloro-4H-s-triazolo[1,5-a][1,4]benzodiazepine-2-carboxylic acid;

from 77.6 g (0.175 moles) of 1-[2-(α,α,α-trifluoro-o-tolyl)-4-chlorophenyl]-5-(chloromethyl)-1H-1,2,4-triazole-3-carboxylic acid:- 6-(α,α,α-trifluoro-o-tolyl)-8-chloro-4H-s-triazolo[1,5-a][1,4]benzodiazepine-2-carboxylic acid;

from 63.0 g (0.175 moles) of 1-(2-benzoyl-4-fluorophenyl)-5-(chloromethyl)-1H-1,2,4-triazole-3-carboxylic acid:- 6-phenyl-8-fluoro-4H-s-triazolo[1,5-a][1,4]benzodiazepine-2-carboxylic acid;

from 73.7 g (0.175 moles) of 1-(2-benzoyl-4-bromophenyl)-5-(chloromethyl)-1H-1,2,4-triazole-3-carboxylic acid: 6-phenyl-8-bromo-4H-s-triazolo[1,5-a][1,4]benzodiazepine-2-carboxylic acid;

from 71.8 g (0.175 moles of 1-(2-benzoyl-α,α,α-trifluoro-p-tolyl)-5-(chloromethyl)-1H-1,2,4-triazole-3-carboxylic acid: 6-phenyl-8-(trifluoromethyl)-4H-s-triazolo[1,5-a][1,4]benzodiazepine-2-carboxylic acid;

from 67.9 g (0.175 moles) of 1-(2-benzoyl-4-nitrophenyl)-5-(chloromethyl)-1H-1,2,4-triazole-3-carboxylic acid: 6-phenyl-8-nitro-4H-s-triazolo[1,5-a][1,4]benzodiazepine-2-carboxylic acid.

What is claimed is:
1. A compound of the formula Ia

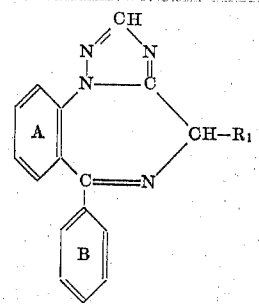

wherein $R_1$ represents a hydrogen atom or an alkyl group having from one to three carbon atoms,
and wherein each of the rings A and B may be unsubstituted or substituted by one chlorine, fluorine or bromine atom, nitro group, trifluoromethyl group, alkyl group having from one to six carbon atom or alkoxy group having from one to six carbon atoms, and the 5-oxide and the pharmaceutically acceptable acid addition salts thereof.

2. A compound according to claim 1 having the formula I$a$, wherein
$R_1$ represents a hydrogen atom
and wherein each of the rings A and B is unsubstituted or substituted by one chlorine fluorine or bromine atom, nitro group, trifluoromethyl group, alkyl group having from one to six carbon atoms or alkoxy group having from one to six carbon atoms.

3. A compound according to claim 1 having the formula I$a$, wherein
$R_1$ represents a hydrogen atom
and wherein each of the rings A and B is unsubstituted or substituted by one chlorine fluorine or bromine atom, nitro group of trifluoromethyl group.

4. A compound according to claim 1 having the formula I$a$, wherein
$R_1$ represents a hydrogen atom
and wherein the ring A is unsubstituted or substituted by a chlorine atom in the 8-position and the ring B is unsubstituted or substituted by a chlorine or fluorine atom in the ortho-position.

5. The compound according to claim 1, which is 6-phenyl-8-chloro-4H-s-triazolo[1,5-a][1,4]benzodiazepine.

6. The compound according to claim 1, which is 6-(o-chlorophenyl)-8-chloro-4H-s-triazolo[1,5-a][1,4]benzodiazepine.

* * * * *